United States Patent
Hoevel (10) Patent No.: US 10,724,662 B2
(45) Date of Patent: Jul. 28, 2020

(54) HOUSING COMPONENT WITH A HYDRAULIC LINE AND THE MANUFACTURE THEREOF

(71) Applicant: Robert Bosch GmbH, Stuttgart (DE)

(72) Inventor: Stefan Hoevel, Neidenstein (DE)

(73) Assignee: Robert Bosch GmbH, Stuttgart, DE (US)

( * ) Notice: Subject to any disclaimer, the term of this patent is extended or adjusted under 35 U.S.C. 154(b) by 365 days.

(21) Appl. No.: 15/480,844

(22) Filed: Apr. 6, 2017

(65) Prior Publication Data
US 2017/0299094 A1    Oct. 19, 2017

(30) Foreign Application Priority Data

Apr. 15, 2016 (DE) .......................... 10 2016 206 356

(51) Int. Cl.
*F16J 15/06* (2006.01)
*F16L 19/00* (2006.01)
*F16K 11/07* (2006.01)
*F16K 27/04* (2006.01)
*F16J 15/02* (2006.01)
*F16L 25/00* (2006.01)
*F15B 13/04* (2006.01)

(52) U.S. Cl.
CPC ............. *F16L 19/00* (2013.01); *F16J 15/022* (2013.01); *F16J 15/061* (2013.01); *F16K 11/07* (2013.01); *F16K 27/041* (2013.01); *F16L 25/0018* (2013.01); *F15B 13/0402* (2013.01)

(58) Field of Classification Search
CPC . F16J 15/062; F16J 15/06; F16L 23/16; F16L 23/162; F16L 23/165

USPC ................. 285/124.5, 294.3, 295.1
See application file for complete search history.

(56) References Cited

U.S. PATENT DOCUMENTS

| | | | | |
|---|---|---|---|---|
| 3,923,311 A * | 12/1975 | Tashlick | ............... | F16L 21/025 277/314 |
| 5,429,374 A * | 7/1995 | Eichenberger | ........... | F16J 15/46 277/552 |
| 5,433,486 A * | 7/1995 | Mannl | ...................... | F23J 13/04 285/114 |
| 5,955,020 A * | 9/1999 | Gholson | ............... | F16L 23/167 264/261 |
| 5,957,589 A * | 9/1999 | Lee | ........................ | F16C 33/107 384/112 |
| 6,176,523 B1 * | 1/2001 | Winslett | ............... | F16L 21/035 285/110 |
| 6,561,433 B2 * | 5/2003 | Sudo | ..................... | F25B 41/062 236/92 B |
| 7,267,653 B2 * | 9/2007 | Higaki | .................. | F16K 15/021 600/576 |
| 8,441,737 B2 * | 5/2013 | Buch | ...................... | G02C 7/085 359/665 |

(Continued)

*Primary Examiner* — David Bochna
(74) *Attorney, Agent, or Firm* — Maginot, Moore & Beck LLP (57) ABSTRACT

A housing component includes a line segment of a hydraulic line. The line segment has at least one channel that opens into a widening. The widening extends to outside of the housing component. A spatially limited sealing surface enclosing the channel is provided in the widening. A seal comprising an adhesive is joined to the sealing surface at least adhesively. A method for manufacturing such a housing component includes layered manufacture of the sealing surfaces.

10 Claims, 5 Drawing Sheets

(56) References Cited

U.S. PATENT DOCUMENTS

| | | | | |
|---|---|---|---|---|
| 8,468,849 B2 * | 6/2013 | Kesler | .................... | F16L 39/00 |
| | | | | 62/527 |
| 2014/0070494 A1 * | 3/2014 | Winkelmann | ......... | F16J 15/166 |
| | | | | 277/314 |
| 2014/0216593 A1 * | 8/2014 | Lenes | .................... | F16L 57/06 |
| | | | | 138/141 |
| 2016/0076677 A1 * | 3/2016 | Conrad | .................... | B32B 5/22 |
| | | | | 285/294.1 |

\* cited by examiner

HOUSING COMPONENT WITH A HYDRAULIC LINE AND THE MANUFACTURE THEREOF

This application claims priority under 35 U.S.C. § 119 to patent application number DE 10 2106 206 356.1, filed on Apr. 15, 2016 in Germany, the disclosure of which is incorporated herein by reference in its entirety.

BACKGROUND

The present disclosure concerns a housing component, comprising a line segment of a hydraulic line with at least one channel and a spatially limited sealing surface enclosing the channel. Furthermore, a method for manufacturing the housing component is specified, in particular for providing a seal on the sealing surface of the channel.

The disclosure is for use in particular with hydraulic blocks that are used to transport a fluid under high pressure, in particular oil. The disclosure is especially for use with valve housing blocks or valves that have had a housing of a cast metallic material until now. The valve is usually bolted onto a control block and is connected to a connection surface by a hydraulic line that is formed in the control block. The fluid channels open at the connecting surfaces of the valves. The openings are encircled by annular grooves, in which separate, elastic sealing rings (in particular for an axial seal) are inserted. The sealing rings are for example formed with an elastomer and/or as a type of O-ring with a predetermined internal diameter and a so-called cross-section diameter. For the application described here, the cross-section diameter preferably lies in the range from approximately 1 mm to 7 mm [millimeter].

With the sealing of the connections of hydraulic valves with O-rings, said O-rings are inserted in recesses on the connections during assembly. Then a cover is put on or the valve is screwed into the assembly at a desired seating position. The O-rings are held in position in operation by the pressing force. During the assembly, there is a risk that the O-rings are (inadvertently) lost and this is only noticed on the test bed or by the customer owing to extraordinary leakage. The insertion of the O-rings is carried out manually, wherein in particular after the insertion of the O-rings still more manual steps, transportation and/or displacement of the valve housing must be carried out, wherein here too the desired accurate positioning of the O-ring can be lost. But just said accurate positioning of the O-rings is necessary if leakage is to be prevented despite the high static pressures occurring with such applications as well as pressure pulses (for example up to 350 bar) during operation.

It has previously been known to manufacture hydraulic blocks from the solid material. In this case, the flow channels and clearances were produced for example by means of drilling and/or grinding. In this case, here too with reference to the O-rings a particularly good, smooth surface (for example $R_{Z,max}=4$ or 6 μm) on the sealing surface is achieved, which in most cases requires rework. Such manufacturing of hydraulic blocks or housing components with a line segment of a hydraulic line is technically relatively complex and thus also time-intensive and cost-intensive.

In addition, with seal grooves that comprise no internal webs for space reasons, during operation it can occur that an O-ring is pressed or slips in the channel if a back pressure builds up on the inside of the O-ring. Furthermore, it has been determined that owing to an unsteady and dynamic pressure application from the interior, the seal can be subjected to strong alternating stresses, which is accompanied by a repetitive deformation of the seal during operation, which can initiate the risk of damage to the seal and a reduced operating life. Said risk is in particular increased if the seal is already damaged and/or is not aligned accurately during the (manual) assembly.

SUMMARY

The object of the present disclosure is to specify a housing component with which the problems mentioned in connection with the prior art are at least partly solved. In particular, a housing component will be specified that is improved regarding the manufacturability thereof at reduced cost or with lower complexity and/or regarding improved leak protection and/or regarding a gentler way of using seals for the aforementioned application. In particular, adaption of the sealing measures will be achieved in this respect such that leakage is reliably reduced or entirely prevented, wherein in particular advantages are also achieved relating to the manufacturability and reworkability of the sealing surface.

Moreover, it will be achieved that seals to be positioned on the sealing surfaces during assembly are exposed to a lower risk of damage. Furthermore, a reliable seal against seepage of hydraulic fluids at high pressures, namely in the event of pulsation, will be achieved.

Said objects are achieved with a housing component according to the features of the following disclosure. Further advantageous embodiments of the housing component as well as preferred manufacturing methods and applications are specified below. It is to be noted that the description, in particular in connection with the figures, indicates particularly preferred design variants of the disclosure. The features mentioned in the description characterize the disclosure further, wherein said features can be combined with each other in any technologically meaningful manner.

In order to achieve said object, a housing component is used comprising a line segment of a hydraulic line with at least one channel that opens into a widening that extends to the outside of the housing component. A spatially limited sealing surface enclosing the channel is provided in the widening, wherein a seal comprising an adhesive is at least adhesively connected to the sealing surface.

With the solution proposed here, the seal is formed by applying a (sealing) adhesive to the provided sealing surfaces. Said adhesive sticks to the surface of the sealing surface, so that loss of the applied seal during subsequent assembly steps or transport steps is reliably prevented. It is possible that there is essentially only an adhesive joint between the seal and the sealing surface. In addition, mechanical anchorages, positive locking joints and/or additional substance-to-substance bonding can also be implemented on the interfaces.

The proposed solution is based in particular on the idea of implementing reliable and durable protection of the housing component against leakage losses by escaping hydraulic oil by the adhesive function of the sealant of the seal.

The (preferred metallic) housing component is in particular a so-called valve block or a so-called control block for a valve arrangement of a hydraulic system. The housing component can comprise a (single) hydraulic line or a plurality of hydraulic lines inside. In particular, the line segment of the hydraulic line that comprises a channel that opens to the outside of the housing component is considered. In particular, a sealing surface is provided around the channel in said region. This is in particular formed around the channel on the inner bottom of the widening emanating from the outside of the housing component. Likewise, the wall surfaces of the widening can be used as sealing surfaces. It is also possible that both aforementioned surfaces form the sealing surface.

In this way, in particular housing components are proposed here that are improved or better adjusted regarding the flow technology, the weight, the mountability, the durability and/or the manufacture thereof. It can be achieved that the disadvantages for the sealing surfaces that exist with the prior art are eliminated or at least lessened by the measures proposed here. Moreover, reworking of the surface of the sealing surfaces in the event of any roughness, scoring or similar being present is avoided. Any roughness, scoring or similar that is present is now used for better (possibly additional mechanical) anchoring of the sealing adhesive of the seal relative to the sealing surface. This is especially of particular advantage at high pressures of the hydraulic fluid, in particular in the event of pulsation.

The seal is preferably an annular seal. In particular, this is expressed such that the seal completely encloses the channel in the peripheral direction. It is not absolutely essential that the annular seal is circular. In particular, in this case the point in time is considered when the adhesive of the seal has hardened and is joined to the sealing surface.

Advantageously, the seal is formed with a polyacrylate. Particularly preferable is an adhesive elastic polyacrylate. Most particularly, the adhesive is a paste-like mass based on polyacrylate, which can be hardened by means of heat and/or (particularly preferably) by means of UV light.

Advantageously, the depth of the widening is less than 2.0 mm [millimeters]. Thereby in particular a depth is specified that is smaller compared to the widenings for conventional O-rings. It has been found that such adhesive seals can be provided with a smaller material volume and/or with a greater axial protrusion owing to the particularly good (possibly also radially wider) bonding thereof. Therefore, there can be applications for which the depth would be selected for example at a maximum of 1.5 mm, 1.2 mm or even a maximum of 0.75 mm.

The seal forms a sealing body that is disposed in the widening. In a hardened and relaxed state, the seal has an axial extent that extends beyond the depth of the widening. Here an axial extent means an extent in an axial direction. There is thus a protrusion of the seal that protrudes out of the widening or that protrudes beyond the outside of the housing component. The seal is possibly compressed in the axial direction if a connection component is connected to the housing component, so that there are sealing forces on the seal.

Preferably, the roughness ($R_z$) of the sealing surface is greater than 10 μm [micrometers]. It is particularly preferable that the sealing surface has a roughness $R_z$ of at least 20 μm or even at least 30 μm, wherein the roughness $R_z$ on the sealing surface should not exceed 100 μm. The roughness-range specified here lastingly assists the adhesive joint or even the additionally mechanically anchored joint of the seal with the sealing surface on the housing part.

Advantageously, the sealing surface comprises a structured surface. The sealing surface has for example a structured surface if it comprises at least one score, furrow, groove, dent, etc., that is larger than the average roughness and that is preferably smaller than 20% or even less than 10% of the depth of the widening. The structured surface forms an anchorage for the sealing adhesive. At the same time, the structuring forms an enlargement of the surface and thereby an enlarged contact surface between the sealing adhesive and the sealing surface. As a result, a device for anchoring and at the same time the barrier against escaping leakage oil are implemented.

In addition, an arrangement is proposed comprising a housing component of the type presented here, a connection component as well as a seal, wherein the latter is pressed with the connection component against the sealing surface. In particular, a mounted state is specified here, in which for example a hydraulic line can be/is joined in a leak-tight manner to such a housing component by means of the seal.

According to a further aspect, a method for manufacturing a housing component of the type described above is specified, with at least the following steps:
a) providing a housing component comprising a line segment of a hydraulic line with at least one channel that opens into a widening that extends to the outside of the housing component, wherein a spatially limited sealing surface enclosing the channel is provided in the widening and;
b) applying an adhesive to the sealing surface;
c) forming a seal from the adhesive, wherein the seal is joined at least adhesively to the sealing surface.

A method is proposed, with which the seal of a sealing adhesive is preferably applied by machine to the provided sealing surface. Said adhesive adheres to the surface, so that the loss of the applied sealing ring is impossible. A particular advantage of the method is that a reliable seal against escaping hydraulic fluid, in particular hydraulic oil, is implemented by the sealing adhesive.

Regarding the design and shape of the housing component that is provided in step a), please refer to the rest of the description in full.

It is possible that a cleaning step is also carried out prior to step b), during which all contamination is removed from the sealing surface, at least in the regions in which the adhesive is to be applied.

In step b), the adhesive is applied to the desired points on the sealing surface. This can be carried out manually, but it is preferably added automatically or by machine. For this purpose, a dispenser can be used. The necessary amount of adhesive to form the seal can be applied with a single application or in layers (for example with two layers). In this case the adhesive is preferably viscous or paste-like during step b). For positionally accurate and/or quantitatively predetermined application, a dosing device can be used.

In step c), the seal is formed and joined to the sealing surface (permanently). For this purpose, the adhesive is preferably cured or hardened and adhesively joined to the surface of the sealing surface. The seal is then preferably no longer viscous or paste-like but viscoplastic or solid. Nevertheless, the seal can be (partly) elastic.

The applied sealing adhesive is preferably hardened by means of UV light. For this purpose, the adhesive can be exposed for example over a period of no more than 30 seconds to a UV irradiation unit. Active substances provided in the adhesive, such as for example reactive acrylate, photoinitiators, curing agents, etc., carry out a chemical reaction under UV light and solidify the adhesive in seconds, so that the seal is produced with the desired properties.

For a hydraulic line (bore), in particular the following process can be performed:
dosed addition of the adhesive as a type of annular bead around the hydraulic line in the region of the sealing surface (period for example 3-5 seconds at a feed rate of approximately 1.5 m/min) and hardening of the adhesive under UV light radiation over a period of approximately 20 seconds, wherein a distance from the US light source of approximately 140 mm is maintained.

In particular, a method for assembling an arrangement is also proposed, wherein the housing component with the seal obtained according to the steps a), b) and c) is constructed with a connection component so that the connection component presses/clamps the seal against the sealing surface.

Furthermore, within the context of providing a housing component according to step a), a method for manufacturing the housing component of the type described above is proposed, with at least the following steps:

a. providing a layer of loose material on a base,
b. joining the layer to a solid body by means of a high-energy beam that follows a predetermined path along a layer,
c. repeating steps a. and b.

In particular, a so-called "rapid prototyping" method or even a "generative method for manufacturing solid bodies" is used with the manufacturing method proposed here. In particular, this means "solid free form fabrication methods", which concern methods for manufacturing the component directly from computer data, such as in particular so-called electron beam melting, stereolithography, selective laser sintering and similar.

Most particularly preferably, the method is implemented as selective laser melting (SLM). The SLM method is a "rapid prototyping" method that is exclusively used for manufacturing from metal, such as with 3D printing whereby the components are built up by the layer-by-layer printing method (also known as "additive manufacturing"). The manufacture of the components is carried out with laser beam melting. In contrast to selective laser sintering (SLS), with selective laser melting (SLM) the powdered material is not sintered. With the SLM method the powdered material is directly melted onto the processing point locally by the thermal energy of a laser beam. The powdered material is heated to just below the melting temperature, wherein this can be carried out under protective gas so that the material is not oxidized.

For this purpose, first according to step a. a layer of loose material is provided on a base. The depth of the layer can be set for this as needed, wherein the depth of the layer is preferably in the range from 0.01-0.05 mm [millimeters]. As "loose material", in particular a powder is considered, most particularly preferably a metallic powder. Most particularly preferably, in particular regarding the preferred hydraulic application area, a metallic powder of the following type is used:

material: CrNi-steel
(e.g. material number 1.2709/X3NiCoMoTi18-9-5)
Powder size: 0.01-0.05 mm [millimeters]

Even if the loose material can in principle be provided under or in a fluid, provision is preferably made in the usual ambient conditions (atmosphere).

According to step b., at least some of the loose material or a predetermined region of the layer is joined to a solid body by means of a high-energy beam. For this purpose, the high-energy beam is used in particular to at least partly melt the loose material and to form a permanent joint to adjacent material components. This concerns on the one hand the material of the topmost (covering) layer as well as possibly the material of a (sub) layer below said topmost layer, if the steps a. and b. have already been carried out at least once. A laser beam or an electron beam is usually used as the high-energy beam. During this the high-energy beam is guided along a predetermined (controlled or regulated by the computer) path over or on the (covering) layer during the formation of the joint. The path can be continuous, but it is possible that separate paths can be traversed with the high-energy beam in different regions of the layer.

For building up the desired component including the line segment, said steps a. and b. are repeated according to the dimensions of the component. In this way, the component is built up layer by layer and revised with the high-energy beam. This repetition of the steps a. and b. is carried out in particular until the sealing surface (on the outside of the solid body) is finished.

In particular, in this way a surface profile is set up that reliably prevents leakage and slippage of the seal in the channel, especially for the application described above with a seal comprising an adhesive. In particular, it is achieved that the roughness and/or scoring that may occur on the surface during manufacturing by a "generative" or "adaptive" manufacturing method mentioned above cause(s) (mechanical) anchoring of the seal relative to the sealing surface. An additional protection against leakage is also achieved by the increased surface pressure.

In particular, it is also achieved that subsequent reworking of the sealing surface can already be avoided by the use of a high-energy beam or the specific guidance thereof along a path, since with the sealing with adhesive proposed here the adhesion effect and/or the mechanical anchoring with the sealing surface is/are promoted by the aforementioned greater roughness/surface structures.

In particular, to implement a defined, predetermined surface structure (for example in the manner of transverse and/or peripheral scoring or similar), adjusted laser or electron beam guidance can be used. Thus, it is in particular also proposed that the surfaces of the component that are built up successively from the layers are consolidated with a predetermined path contour that is adapted to the function of the surface. To carry out the method, so-called CAG data or the layer sequence data of the 3D-component beam guidance data are predetermined. Thus, for example, virtual surfaces can be placed in the CAD program with a specified beam direction or a specified path. Said virtual surfaces are taken into account during the implementation of the CAD model in a layer sequence, and not only the presence of material but also a beam direction is predefined in the layer sequence. Said paths enable specific shaping of the microscopic and/or macroscopic surface structure of the sealing surface as well as the bounding regions.

It is preferable that the housing component is built up in layers, at least in the region of the sealing surface. In particular, this means that at least said region comprises an inner material structure that results from the manufacture by means of a "generative" or "adaptive" manufacturing method. The preferred manufacturing method for this purpose is described below. Most particularly, it is preferable that the sealing surface is built up in layers in a way that results directly from the "generative" or "adaptive" manufacturing method, wherein in particular remachining has not been carried out on the sealing surface. Such a layer-by-layer build-up of the housing component, of the line segment, the hydraulic line, the channel, the sealing surface and/or the surface structure is technically simple to manufacture and also can be easily recognized on the component. The surface produced following manufacture can then be used for the application of the adhesive without further mechanical reworking.

In addition, the use of an adhesive (in particular based on polyacrylate) is proposed to implement sealing of hydraulic lines with a rated pressure greater than 100 bar, in particular greater than 300 bar.

It is particularly preferable to use a housing component and/or an arrangement, as has already been described, to transport a hydraulic fluid under high pressure. Such a housing component can also be referred to as a hydraulic block. Further (separate) line segments, valves or similar can be connected to or in the housing component, wherein a seal between the housing component and the bounding elements is implemented by means of a sealing element in contact with the sealing surface. The preferred use of the housing component or the requirements on the sealing surfaces can be illustrated using the following characteristics:

hydraulic fluid: oil maximum working pressure: 50-400 bar (static or dynamic)

maximum volumetric flow: up to 100 l/min [liters per minute]

working temperature range: −30-80° C.

viscosity range: 2.8-500 $mm^2$/s [square millimeters per second]

The housing component is preferably formed with a metal, preferably with a chrome-nickel-steel with a tensile strength in the range 600-1000 $N/mm^2$ [Newtons per square millimeter].

The disclosure and the technical environment are described in detail below. It is to be noted that identical components in the different figures are always provided with the same reference characters. The figures are schematic and are provided with the same reference characters. The figures are schematic and in particular are not suitable for illustrating proportions in this respect.

DETAILED DESCRIPTION

Figure 1:
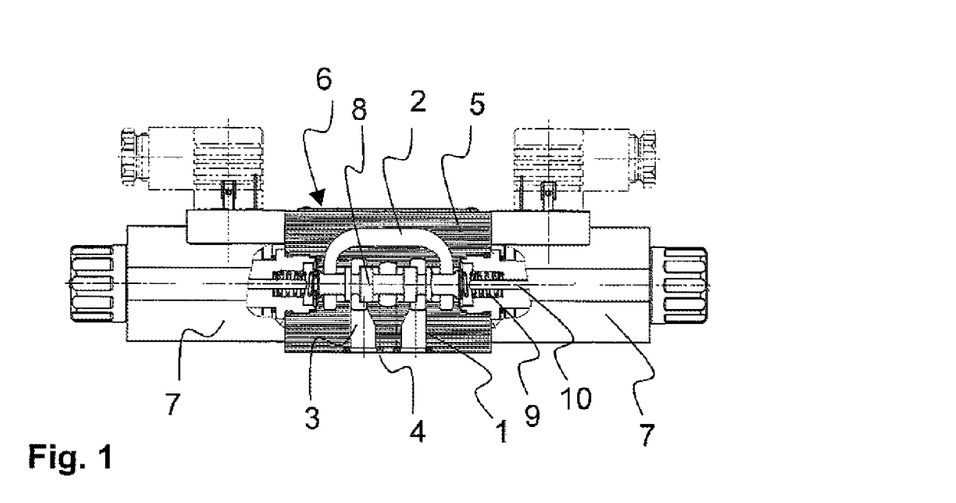
FIG. 1: shows a magnetically operated sliding directional control valve of a hydraulic component.

FIG. 1 shows by way of example a number of further components that can comprise a line segment of a hydraulic line and a magnetically operated sliding directional control valve. This is implemented with a housing component 6 that is formed with a solid body 5 manufactured according to the method proposed here. A (possibly branched) hydraulic line 2 is formed in the housing component 6. The hydraulic line 2 illustrated here exits the solid body 5 at two points of the housing component 6. In each case a line segment 1 is formed there that has a channel 3 and a spatially limited sealing surface 4 enclosing the channel 3. The channel 3 opens into a widening 14 (cf. FIG. 2).

For illustration purposes, the operation of said magnetically operated sliding directional control valve will be briefly illustrated. Two magnets 7 are provided to the side of the housing component 6, using which a sliding control element 8 that is centrally disposed in the component housing 6 can be displaced. The sliding control element 8 can be displaced on both sides respectively by means of a rod 10 that can be moved by the magnets 7 and against a restoring spring 9. In the non-operated state, the sliding control element 8 is held in a central position or in a desired initial position by the restoring spring 9. The operation of the sliding control element 8 is carried out by means of the controllably switched magnets 7. The force produced by the magnets 7 acts via the rod 10 on the sliding control element 8 and displaces the sliding control element 8 out of the rest position thereof into the desired end position. As a result, the demanded volumetric flow direction as required is free. Following deactivation of the magnets 7, the sliding control element 8 is pushed back into the rest position thereof by the restoring spring 9.

Because connection components are provided in the region of the two line segments 1, with which the hydraulic fluid under high pressure (in particular oil) is transported further, it is necessary to provide a permanent seal of the hydraulic line 2 against said components.

Figure 2:
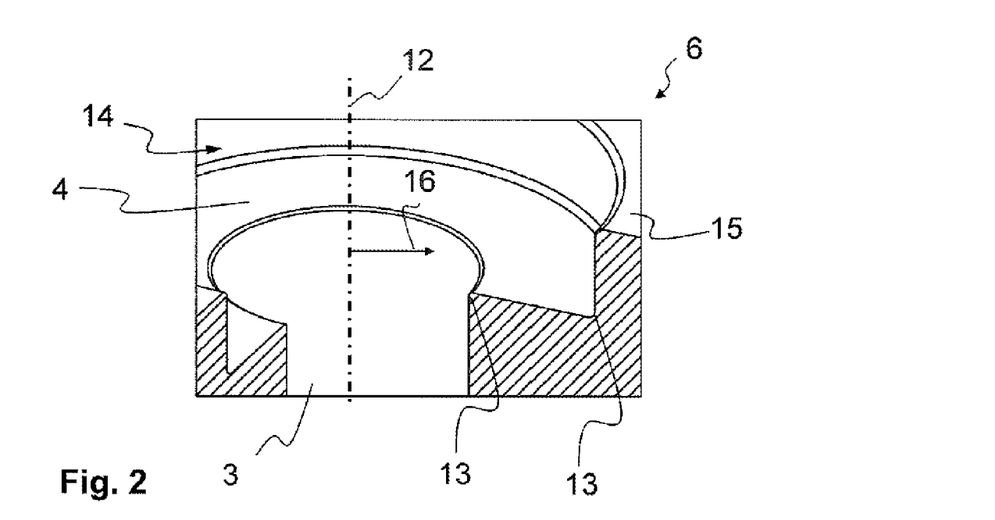
FIG. 2: shows the channel, the widening, the outer surface and the sealing surface according to FIG. 1 in a perspective view.

FIG. 2 shows a detail of the housing component 6 in a partial section and in a perspective view, wherein the channel 3 is represented centrally with a center axis 12. The spatially limited sealing surface 4 is provided radially outside and enclosing the channel 3. In the example shown, the sealing surface 4 is essentially of a flat form between the radially inner boundary 13 and the radially outer boundary 13. A radius is formed in the transition region from the widening 14 to the outside 15.

Figure 3A:
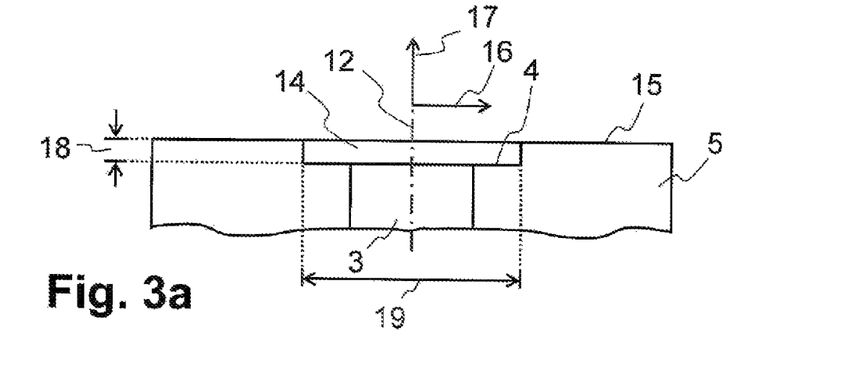
FIGS. 3*a*-3*c*: show a representation of a method for assembling an arrangement comprising a housing component, an annular seal and a connection component.

FIG. 3*a* shows a detail of the housing component 6 with the solid body 5 in a side view, wherein here in particular a detail of the channel 3 with the sealing surface 4 is illustrated. The channel 3 and also the bounding (essentially cylindrical) widening 14 are represented. The widening 14 extends from the outside 15 in the axial direction 17 over a certain depth 18 and has a predetermined diameter 19.

Figure 3B:
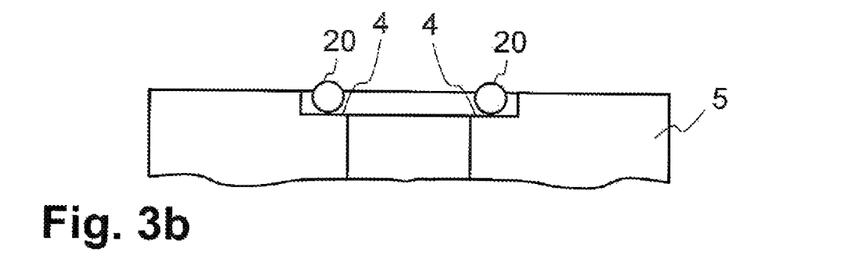

According to FIG. 3*b*, in a first step sealing adhesive of a (still unformed) annular seal 20 is introduced into the widening 14. The annular seal 20 is of an approximately oval form in cross-section. The lower region of the annular seal 20 is in contact with the sealing surface 4. The upper region of the annular seal 20 protrudes beyond the outside 15 of the solid body 5. The annular seal 20 consists of an adhesive sealant, for example polyacrylate. In a further step (not shown), the introduced sealing adhesive of the annular seal 20 is hardened, for example by UV irradiation.

Figure 3C:
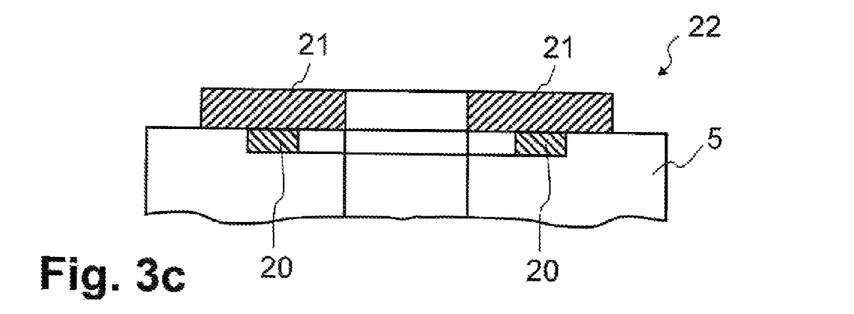

Finally, in yet another step according to FIG. 3*c* a connection component 21, for example a valve, is disposed on the housing component 6 with contact to the annular seal 20. The housing component 6 formed with the solid body 5 is now a component of an arrangement 22 that comprises the connection component 21 as well as the annular seal 20, wherein the annular seal 20 is in contact with the sealing surface 4 with the adhesive surface 11 (cf. FIG. 6) and is pressed with the connection component 21 against the sealing surface 4 by means of a surface pressure 43 (cf. FIG.

6). Moreover, the annular seal 20 is in contact with the inner wall surface of the widening 14 in a shape-locking manner and is pressed against the inner wall surface of the widening 14. At the same time, there is a defined contact of the connection component 21 on the outside 15 of the housing component 6 (in the radial direction 16 adjacent to the channel 3), so that a specifically produced sealing effect is achieved.

Figure 4A:
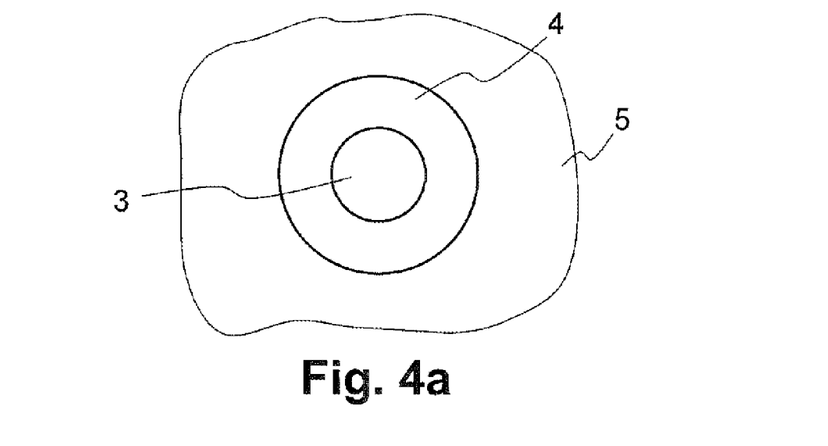
FIG. 4*a*: shows a top view of the housing component according to FIG. 3*a* without an annular seal

FIG. 4a shows a top view of the solid body 5 of the housing component 6 according to FIG. 3a without an annular seal 20. The sealing surface 4 is implemented as a circular ring and is disposed concentrically around the channel 3.

Figure 4B:
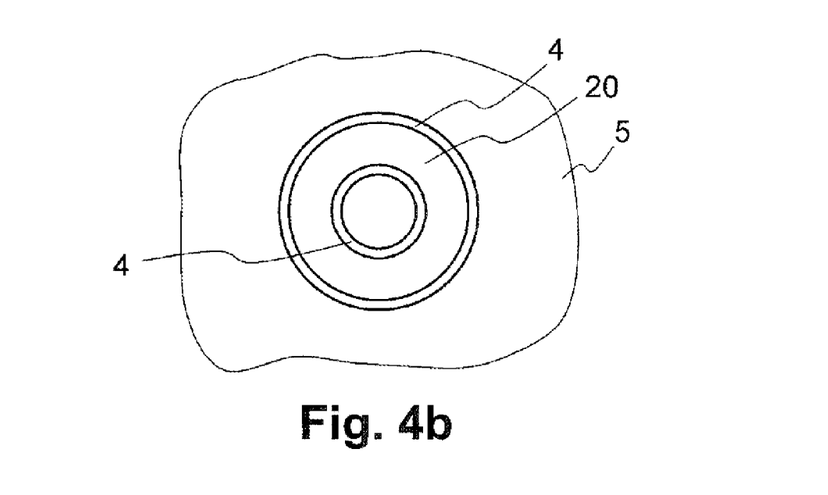
FIG. 4*b*: shows a top view of the housing component according to FIG. 3*b* with an inserted annular seal.

FIG. 4b shows a top view of the solid body 5 of the housing component 6 according to FIG. 3b with an introduced annular seal 20. The annular seal 20 is implemented in an annular ring form in the top view and encloses the channel 3 concentrically and coaxially (in the axial direction 17).

Advantageously, a 1K-adhesive hardened under UV irradiation can be used as a polyacrylic adhesive. Advantageously, the sealing adhesive is viscoplastic in the hardened state.

Figure 5:
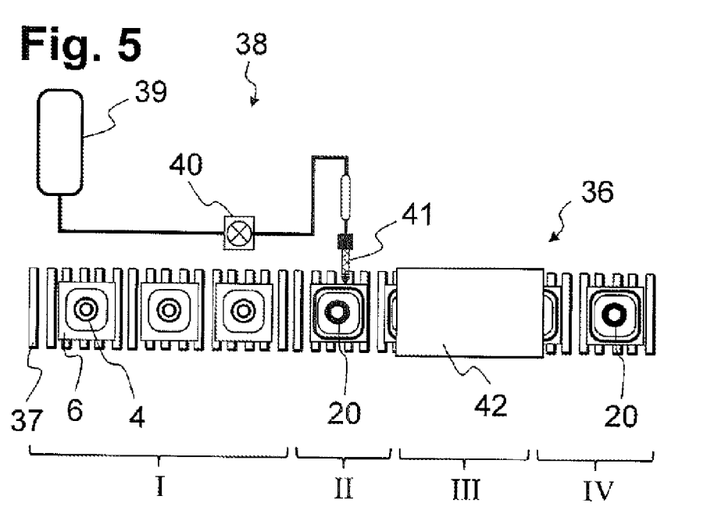
FIG. 5: shows a top view of a production line and a dispenser for a sealing adhesive.

FIG. 5 shows in a top view a production line 36 and a conveyer arrangement 37, for example a roller conveyer. A dispenser 38 for the sealing adhesive is integrated within the production line 36. The dispenser 38 comprises a tank 39 for the sealing adhesive, a pump 40 and a controlled robot 41 for applying the sealing adhesive to the sealing surface 4. A hardening device is denoted by 42, for example a UV irradiation device. It is also possible that instead of a production line 36, a guided process is carried out with a robot (not shown here). Said robot would then introduce the individual housing components successively in single stations, in which each of the individual processing steps disposed along the production line of the manufacturing process are carried out. Combined methods are also conceivable, which carry out the delivery of the housing component to the individual processing steps partly with a production line and partly with a robot.

With the arrangement shown in FIG. 5, the sealing adhesive is applied to the provided sealing surfaces 4 by machine (only one is represented). For applying the sealing adhesive, the housing component 6 is clamped/positioned in the machine.

The application of the annular seals 20 (only one is represented) of an NG6 valve is carried out in an automated manner in two layers using the dispenser 38 and lasts a total of 16 seconds. The applied sealing adhesive is then hardened over 20 seconds under UV radiation. Then the valve and seal 35 can be handled. I denotes the region of the housing components 6 loaded on the conveyer 37, II denotes the region of the application of the sealing adhesive, III denotes the region of the hardening of the sealing adhesive and IV denotes the region of the finished housing component 6 and annular seal 20.

Figure 6:
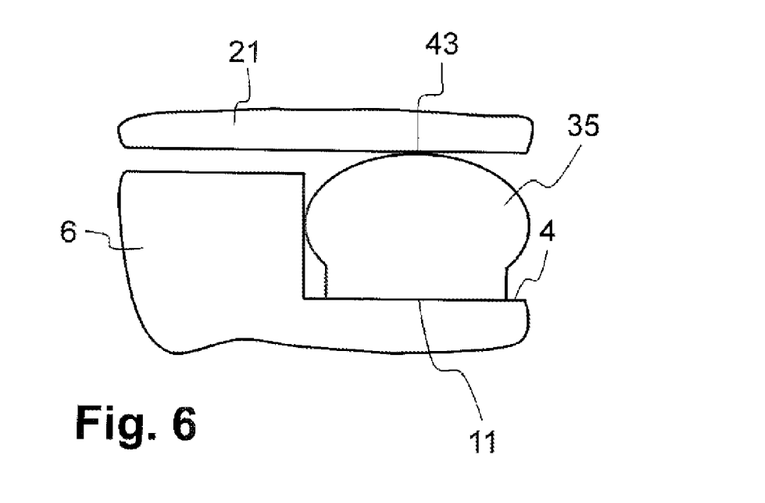
FIG. 6: shows a cross-section of a further implementation of the seal.

FIG. 6 illustrates a cross-section of a further implementation of the seal 35. A lower, essentially rectangular part and an upper, essentially oval part are shown. The lower part comprises the adhesive surface 11, to which the seal 35 with the sealing surface 4 is fixedly joined. 43 denotes a surface pressure on the upper edge of the upper part, indicating the location at which the connection component 21 presses on the seal 35 and joins it elastically.

Figure 7:
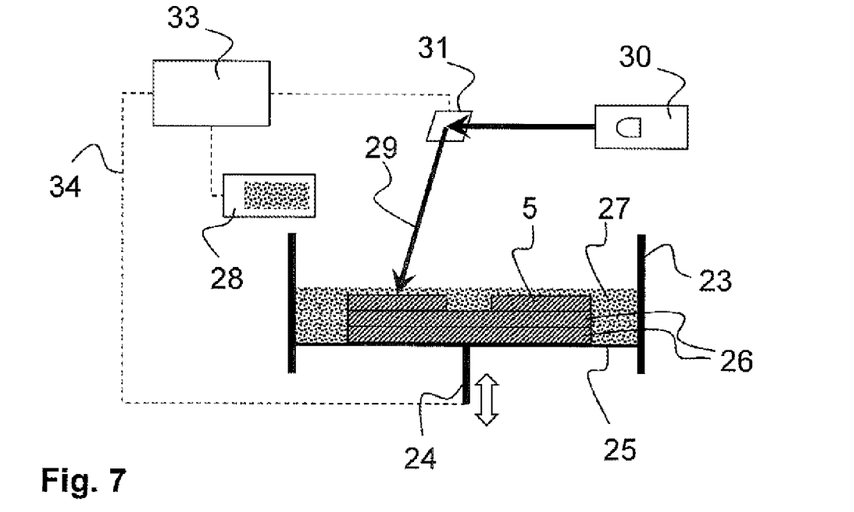
FIG. 7: shows a representation of a method for manufacturing a housing component

FIG. 7 shows schematically an arrangement for carrying out a method for manufacturing a housing component 6 of the type proposed here. For this purpose, a container 23 is implemented with a base 25 that can be displaced (vertically) by means of a displacement device 24. A layer 26 of loose material 27 can be placed on said base 25 by means of the filling apparatus 28. When the predetermined depth of the layer is reached, a high-energy beam 29 that is produced in a beam generator 30 and possibly deflected by means of a lens 31 is passed to the loose material 27. In doing so, the high-energy beam 29 sweeps over a predetermined path 32 along the layer 26, wherein the loose material 27 is at least partly melted and sintered with the adjacent material. This enables a desired solid body 5 to be produced layer 26 for layer 26 in succession. The individual processes or apparatuses of the arrangement can be controlled by means of a control unit 33 and data lines 34 that are suitable for this purpose, so that the desired component geometry is achieved. In particular, the control unit 33, owing to the CAD data available thereto, specifically predetermines the movements of the filling apparatus 28, of the high-energy beam 29 (for example via the lens 31) and of the base 25.

Figure 8:
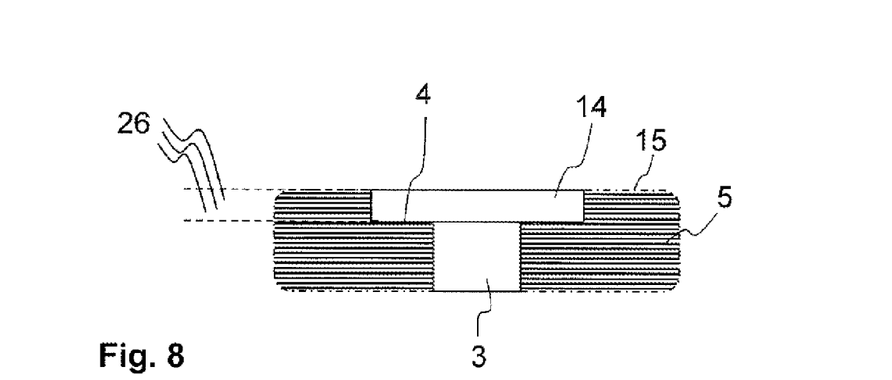
FIG. 8: shows a housing component with a layered structure.

FIG. 8 shows a housing component 6 manufactured according to the method represented in FIG. 5. The surface of the sealing surface 4 can in this case be implemented as relatively rough. By the arrangement of an adhesive annular seal 20 that is made of an elastic sealant and glued onto the sealing surface 4, both the roughness of the sealing surface 4 is used for anchoring and also a complete sealing of the arrangement 22 against leakage losses by escaping oil is achieved.

The disclosure has in particular been described with an example of an annular seal 20 as the seal 35. Seals 35 of a non-annular type, for example films, pads or similar are also included.

In the exemplary embodiment that has been shown and described, the sealing surface 4 has been shown as a horizontal surface within the widening 14 and disposed at right angles in relation to the inner walls of the channel 3. The inner wall surface of the widening 14 that is disposed parallel to the inner wall surfaces of the channel 3 is also included as a sealing surface 4. Both surfaces can also be used as sealing surfaces 4 (cf. FIG. 3c).

REFERENCE CHARACTER LIST 1 line segment
2 hydraulic line
3 channel
4 sealing surface
5 solid body
6 housing component
7 magnet
8 sliding control element
9 restoring spring
10 rod
11 adhesive surface
12 center axis
13 boundary
14 widening
15 outside
16 radial direction
17 axial direction
18 depth
19 diameter
20 annular seal
21 connection component
22 arrangement
23 container
24 displacement device 25 base
26 layer
27 loose material
28 filling apparatus
29 high-energy beam
30 radiation generator
31 lens
32 path
33 control device
34 data line
35 seal
36 production line
37 conveyer
38 dispenser
39 tank
40 pump
41 robot
42 hardening device
43 surface pressure

What is claimed is:

1. A housing component comprising:
    a solid body defining a line segment of a hydraulic line, the line segment having at least one channel that opens into a widening defined by the solid body, the widening opening to an outside of the solid body, wherein the solid body includes a spatially limited sealing surface that partially defines the widening and surrounds the channel; and
    a seal comprising an adhesive, the seal being joined to the sealing surface by at least the adhesive,
    wherein the seal comprises polyacrylate, and
    wherein the sealing surface comprises a structured surface that includes at least one score, furrow, groove, or dent that is larger than an average roughness of the sealing surface and is less than 10% of a depth of the widening.

2. The housing component according to claim 1, wherein the seal is an annular seal that surrounds the channel.

3. The housing component according to claim 1, wherein the widening has a depth defined extending into the block from the outside of the solid body of less than 2.0 mm.

4. The housing component according to claim 3, wherein the sealing surface of the solid body is annularly shaped, and the solid body further includes a circumferential surface extending from the sealing surface to the outside of the solid body, the circumferential surface defining the depth.

5. The housing component according to claim 1, wherein a roughness $R_z$ of the sealing surface is greater than 10 μm.

6. The housing component according to claim 1, wherein the adhesive of the seal is hardened with UV light.

7. The housing component according to claim 1, wherein:
    the solid body is formed of a plurality of layers, at least in a region of the sealing surface, that are fused together.

8. A method for manufacturing a housing component, comprising:
    providing a housing component comprising a solid body that defines a line segment of a hydraulic line, the line segment having at least one channel that opens into a widening defined by the solid body, the widening opening to an outside of the solid body, wherein the solid body includes a spatially limited sealing surface that partially defines the widening and surrounds the channel;
    applying an adhesive to the sealing surface; and
    forming a seal from the adhesive, wherein the seal is joined to the sealing surface at least adhesively by the adhesive,
    wherein the seal comprises polyacrylate, and
    wherein the sealing surface comprises a structured surface that includes at least one score, furrow, groove, or dent that is larger than an average roughness of the sealing surface and is less than 10% of a depth of the widening.

9. The method according to claim 8, wherein the forming of the seal from the adhesive comprises hardening the adhesive with UV light.

10. The method according to claim 8, wherein:
    providing the housing component further comprises manufacturing the solid body by building up the solid body in layers, at least in a region of the sealing surface, building up the solid body in layers including:
    a) providing a layer of loose material on a base;
    b) joining the layer to the solid body using a high-energy beam that follows a predetermined path along the layer; and
    c) repeating a) and b).

\* \* \* \* \*